US007355660B2

(12) United States Patent
Ikeda

(10) Patent No.: US 7,355,660 B2
(45) Date of Patent: Apr. 8, 2008

(54) LIQUID CRYSTAL DISPLAY DEVICE AND GAMING MACHINE

(75) Inventor: Hiromichi Ikeda, Tokyo (JP)

(73) Assignee: Aruze Corp., Tokyo (JP)

( * ) Notice: Subject to any disclaimer, the term of this patent is extended or adjusted under 35 U.S.C. 154(b) by 392 days.

(21) Appl. No.: 10/985,833

(22) Filed: Nov. 10, 2004

(65) Prior Publication Data

US 2005/0137019 A1 Jun. 23, 2005

(30) Foreign Application Priority Data

Nov. 11, 2003 (JP) .......................... P2003-381480

(51) Int. Cl.
*G02F 1/1333* (2006.01)

(52) U.S. Cl. .......................................... 349/60; 349/58

(58) Field of Classification Search .................. 349/58, 349/60
See application file for complete search history.

(56) References Cited

U.S. PATENT DOCUMENTS 4,718,672 A 1/1988 Okada
5,825,342 A 10/1998 Akebi et al.
2001/0031658 A1 10/2001 Ozaki et al.
2003/0031453 A1 2/2003 Tsubokura et al.

FOREIGN PATENT DOCUMENTS

JP 8-80364 3/1996
JP 2001-198265 7/2001
JP 2003-67810 3/2003

*Primary Examiner*—David Nelms
*Assistant Examiner*—David Chung
(74) *Attorney, Agent, or Firm*—Leydig, Voit & Mayer, Ltd.

(57) ABSTRACT

A liquid crystal display device includes a liquid crystal panel unit having a liquid crystal panel; and a support member supporting the liquid crystal panel unit from a back side of the liquid crystal panel unit. A center axis of a viewing angle of the liquid crystal panel unit is not parallel to a line normal to a surface of the liquid crystal panel. The support member is provided with an opening portion transmitting light from the back side toward the liquid crystal panel unit. The opening portion has a region which has 180° rotational symmetry with respect to a center of the supporting member.

9 Claims, 10 Drawing Sheets

LIQUID CRYSTAL DISPLAY DEVICE AND GAMING MACHINE

CROSS-REFERENCE TO RELATED APPLICATION

This application is based upon and claims the benefit of priority from the prior Japanese Patent Application No. 2003-381480 filed on Nov. 11, 2003, the entire contents of which are incorporated herein by reference.

BACKGROUND OF THE INVENTION

1. Field of the Invention

The present invention relates to a liquid crystal display device and a gaming machine.

2. Related Background of the Invention

Generally, various types of gaming machines are known concerning a mode of a game and a cabinet incorporating a gaming device implementing such a game. For example, slot machines which are known as a kind of gaming machines include a type on which a player plays a game while sitting (a so-called slant-type) as disclosed in Patent Document 1: Japanese Patent Application Laid-open No. 2003-67810, and a type on which a player plays a game while standing (a so-called upright-type) as disclosed in Patent Document 2: Japanese Patent Application Laid-open No. 2001-198265.

Such a slot machine generally comprises a gaming device including a reel unit composed of a plurality of rotation reels arranged side by side in a line to be rotatable on each of which symbols are drawn; and a cabinet incorporating the gaming device therein. Further, the cabinet is provided with a display section allowing the rotation reels to be viewed, and an operation section arranged on the lower front side (the player's side) of the display section and having various operation buttons required for playing games and a coin slot.

Incidentally, some of the above-described slot machines have a transmissive liquid crystal display device as the display section attachably/detachably attached to the cabinet. In that case, it is conceivable that the display section (the liquid crystal display device) is shared between the above-described slant-type slot machine and the above-described upright-type slot machine which have similar internal structures.

In FIG. 6, an example of a typical structure of the display section constituted as the transmissive liquid crystal display device is shown. As shown in the drawing, a transmissive liquid crystal display device 131 is constituted of a liquid crystal panel unit 150 composed of a protective glass 132, a liquid crystal panel 134, a diffuser plate 135, a light guide plate 136, and a reflector plate 138; and a liquid crystal panel holder 160 which holds the liquid crystal panel unit 150.

The liquid crystal panel holder 160 is composed of a main body 160A disposed on the back side of the reflector plate 138 (the opposite side to the player) and having an IC drive 152 for driving the liquid crystal panel 134 mounted on back side thereof; a holding frame 160B in a rectangular frame shape which is disposed on the front side of the liquid crystal panel unit 150 (the front side of the protective glass 132), and surrounds a front peripheral portion and peripheral side portion of the liquid crystal panel unit 150 to hold it and is assembled to the main body 160A; and an attachment member 160C fixed to the holding frame 160B and for attaching to the machine body of the slot machine the liquid crystal panel holder 160 which holds the liquid crystal panel unit 150.

Note that the plurality of reels (not shown) on each of which the symbols are drawn are disposed on the back side of the main body 160A and the attachment member 160C. Further, a wiring cable 134*a* which is to be electrically connected to the IC drive 152 extends from the liquid crystal panel 134.

Further, light sources 137*a* and 137*b* are disposed along an upper and a lower end face of the light guide plate 136. These light sources 137*a* and 137*b* are for emitting light into the light guide plate 136 and thus constitutes a backlight for the liquid crystal panel 134 in cooperation with the light guide plate 136. Furthermore, the reflector plate 138 is provided with three respective symbol viewing regions 138*a*, 138*b*, and 138*c* which transmit the symbols formed on the respective reels so as to allow the player to view the symbols. In this case, the symbol viewing regions 138*a*, 138*b*, and 138*c* are formed as open windows created by cutting them out from the reflector plate 138. Further, the main body 160A of the liquid crystal panel holder 160 and the diffuser plate 135 are also provided with open windows 160*a*, 160*b*, and 160*c*; and 135*a*, 135*b*, and 135*c* corresponding to the symbol viewing regions 138*a*, 138*b*, and 138*c*.

In the case in which the display section is constituted as the liquid crystal display device as described above to transmit the symbols on the reels through the liquid crystal screen so as to display them, a symbol display region where the symbols on the reels are transmission-displayed and a effect display region where a effect image, information and so on are displayed are generally provided on the liquid crystal screen. In addition, in this case, even when the symbols on the reels are viewable (when the symbol display region is separately set as described above, though the whole display section may be used as the performance display region), the symbol display region may be disposed, for example, to the upper side of the liquid crystal screen and a large effect display region may be ensured on the lower side of the liquid crystal screen in order to ensure efficiently as much as possible the size of the effect display region. Accordingly, in such a case, the symbol viewing regions 138*a*, 138*b*, and 138*c* in the reflector plate 138, the open windows 160*a*, 160*b*, and 160*c* in the main body 160A of the liquid crystal panel holder 160, and the open windows 135*a*, 135*b*, and 135*c* in the diffuser plate 135 corresponding to the symbol display region will be necessarily formed to the upper side as shown in FIG. 6.

However, the symbol viewing regions 138*a*, 138*b*, and 138*c* in the reflector plate 138, the open windows 160*a*, 160*b*, and 160*c* in the main body 160A of the liquid crystal panel holder 160, and the open windows 135*a*, 135*b*, and 135*c* in the diffuser plate 135 formed to one side (the upper side) causes, in conjunction with characteristics of the viewing angle of the liquid crystal panel 134, following problems in sharing the display portion (the liquid crystal display device) between the above-described slant-type slot machine and the above-described upright-type slot machine.

More specifically, the liquid crystal panel 134 of the liquid crystal display device 131 mounted on the slot machine generally has the viewing angle on the upper side different from the viewing angle on the lower side. In the upright-type slot machine, the liquid crystal panel 134 is mounted in such an orientation that the viewing angle on the upper side is wider because the viewpoint of a player is located at a position where the player looks down to the cabinet (the liquid crystal panel 134) or the front face of the cabinet. On the other hand, in the slant-type slot machine, the liquid crystal panel 134 is mounted in such an orientation that the viewing angle on the lower side is wider because the viewpoint of the player is located at a position where the player looks up to the cabinet (the liquid crystal panel 134). Therefore, when the liquid crystal display device 131 is shared between the slant-type slot machine and the upright-type slant machine, the liquid crystal panel 134 needs to be mounted with the upper and lower portions thereof interchanged (rotated 180°) so that the viewing angles on the upper and lower sides are inverted (in this case, the screen display is vertically and horizontally inverted).

Further, when the liquid crystal panel 134 is mounted with the upper and lower portions thereof interchanged, the main body 160A of the liquid crystal panel holder 160 having thereon the IC drive 152 for driving the liquid crystal panel 134 and so on (actually including the holding frame 160B and the attachment member 160C) also needs to be mounted with the upper and lower portions thereof interchanged in accordance therewith. This is for consistency in mechanical and electrical positional relation between the IC drive 152 and so on electrically connected to the liquid crystal panel 134 and the liquid crystal panel 134. This is also because the wiring cable 134*a* becomes deficient in length unless the upper and lower portions of the main body 160A of the liquid crystal panel holder 160 are interchanged accompanying the interchange of the upper and lower portions of the liquid crystal panel 134, possibly causing a physical restraint such as impossibility of connection between the IC drive 152 and so on to the liquid crystal panel 134.

However, if the liquid crystal panel 134 is mounted with the upper and lower portions of the main body 160A of the liquid crystal panel holder 160 also interchanged, the symbol viewing regions 138*a*, 138*b*, and 138*c* in the reflector plate 138 and the open windows 135*a*, 135*b*, and 135*c* in the diffuser plate 135 become inconsistent in positional relation with the open windows 160*a*, 160*b*, and 160*c* in the main body 160A of the liquid crystal panel holder 160. More specifically, for example, if the upper and lower portions of the liquid crystal panel 134 and the main body 160A of the liquid crystal panel holder 160 are interchanged from the state in FIG. 6, the open windows 160*a*, 160*b*, and 160*c* in the main body 160A of the liquid crystal panel holder 160 are deviated to the lower side and thus do not match the positions of the symbol viewing regions 138*a*, 138*b*, and 138*c* in the reflector plate 138 (the open windows 135*a*, 135*b*, and 135*c* in the diffuser plate 135) and the symbols on the reels which are located at the upper side on the liquid crystal screen at all times. This means that the liquid crystal panel holder 160 can as a result no longer be shared between the slant-type slot machine and the upright-type slot machine. Accordingly, in the prior art, the liquid crystal panel holder 160 is made for exclusive use in the slant-type slot machine or the upright-type slot machine. It is desired, however, that the entire liquid crystal display device 131 can be shared between the slant-type slot machine and the upright-type slot machine.

SUMMARY OF THE INVENTION

The present invention has developed focusing on the above-described situation, and its object is to provide a gaming machine in which all parts of a liquid crystal display device including a liquid crystal panel having different viewing angles on one side and on the other side can be shared between different types of machines having different player's viewpoint positions on the liquid crystal screen which are on one side or on the other side. In other words, an object of the present invention is to provide a liquid crystal display device having a liquid crystal panel capable of being shared between gaming machines having different player's viewpoint positions, and a gaming machine including the liquid crystal display device.

A liquid crystal display device of the present invention comprises a liquid crystal panel unit having a liquid crystal panel; and a support member supporting the liquid crystal panel unit from a back side of the liquid crystal panel unit, wherein a center axis of a viewing angle in the liquid crystal panel unit is not parallel to a normal line of a surface of the liquid crystal panel, the support member is provided with an opening portion transmitting light from the back side thereof toward the liquid crystal panel unit, and the opening portion is arranged so as to have a region which is point symmetry with respect to a center of the supporting member In the present invention, the opening portion can be substantially symmetrical with respect to the center of the supporting member.

Further, a gaming machine of the present invention comprises: the liquid crystal display device of the present invention; and a discrimination information display device for variably displaying discrimination information for a game at a position deviated to one side of the liquid crystal display device, the discrimination display device being provided on a back side of the liquid crystal display device.

According to the liquid crystal display device of the present invention, since the opening portion is provided in the support member as described above, light on the back side of the support member can pass through the support member even if the support member and the liquid crystal panel are inverted. Therefore, this liquid crystal display device can be shared between the upright-type gaming machine and the slant-type gaming machine.

Specifically, one gaming machine of the present invention is a slant-type gaming machine in which the liquid crystal display device is provided such that the liquid crystal panel slants downward from a back side to a front side of the gaming machine. In this gaming machine, the liquid crystal display device is mounted such that the center axis of the viewing angle is located below the normal line of the liquid crystal panel Alternatively, another gaming machine of the present invention is an upright-type gaming machine in which the liquid crystal display device is provided such that the liquid crystal panel is along a vertical surface. In this gaming machine, the liquid crystal display device is mounted such that the center axis of the viewing angle is located above the normal line of the liquid crystal panel.

Further, to solve the above problem, a gaming machine of the present invention includes: a liquid crystal panel unit having a liquid crystal panel displaying an image associated with a game, the liquid crystal panel having different viewing angles on one side and on another side on a display screen thereof; a discrimination display device for variably displaying discrimination information required for the game at a position deviated to the one side on the display screen of the liquid crystal panel; and a retainer retaining the liquid crystal panel unit on a back side thereof, the retainer being provided with a driver for driving the liquid crystal panel and an opening portion for exposing the discrimination information on the discrimination display device toward the liquid crystal panel, the retainer having a first state in which the discrimination information on the discrimination display device is exposed toward the liquid crystal panel through the opening portion, and a second state created by rotating the retainer 180° around a center of the retainer from the first state, and the opening portion, also in the second state, being open in a size capable of exposing the discrimination information on the discrimination display device toward the liquid crystal panel.

According to this gaming machine, the opening portion in the retainer can expose the discrimination information on the discrimination display device toward the liquid crystal panel, both in the first state and the second state which have such a relationship that they are rotated 180° from each other, and therefore even when, for example, the liquid crystal panel is rotated 180° to interchange its upper and lower positions and the retainer is rotated 180° in accordance therewith in a slot machine to share the liquid crystal panel unit between the slant-type slot machine and the upright-type slot machine having different player's viewpoint positions which are on the upper side or on the lower side, the discrimination information on the discrimination display device can be exposed toward the liquid crystal panel through the opening portion in the retainer. Therefore, the retainer can be shared between the slant-type slot machine and the upright-type slot machine, resulting in that the whole liquid crystal display device composed of the retainer and the liquid crystal panel unit can be shared between the slant-type slot machine and the upright-type slot machine. As a matter of course, such a shared form can be realized not only between the slot machines but also among various gaming machines having different player's viewpoint positions on the liquid crystal screen which are on one side or on the other side.

Note that it is desirable that, in the above-described configuration, the opening portion is open, forming a substantially symmetrical shape with respect to a center line passing through the center of the retainer.

Further, a gaming machine of the present invention includes: a liquid crystal panel unit having a liquid crystal panel displaying an image associated with a game, the liquid crystal panel having different viewing angles on one side and on the other side along a predetermined direction on a display screen thereof; a discrimination display device for variably displaying discrimination information required for the game at a position deviated to the one side on the display screen of the liquid crystal panel; and a retainer retaining the liquid crystal panel unit on a back side thereof, the retainer being provided with a driver for driving the liquid crystal panel and an opening portion for exposing the discrimination information on the discrimination display device toward the liquid crystal panel, the opening portion being open, forming a substantially symmetrical shape with respect to a center line passing through the center of the retainer.

According to this gaming machine, the opening portion is open, forming a substantially symmetrical shape with respect to a center line passing through the center of the retainer, and therefore even when the retainer is rotated 180° about its center from the state in which the discrimination information on the discrimination display device is exposed toward the liquid crystal panel through the opening portion, the opening portion in the retainer can still expose the discrimination information on the discrimination display device toward the liquid crystal panel. Accordingly, the operation and effect similar to those of the above-described gaming machine can be obtained.

DESCRIPTION OF THE PREFERRED EMBODIMENTS

A preferred embodiment of the present invention will be concretely described below with reference to the drawings.

Figure 1:
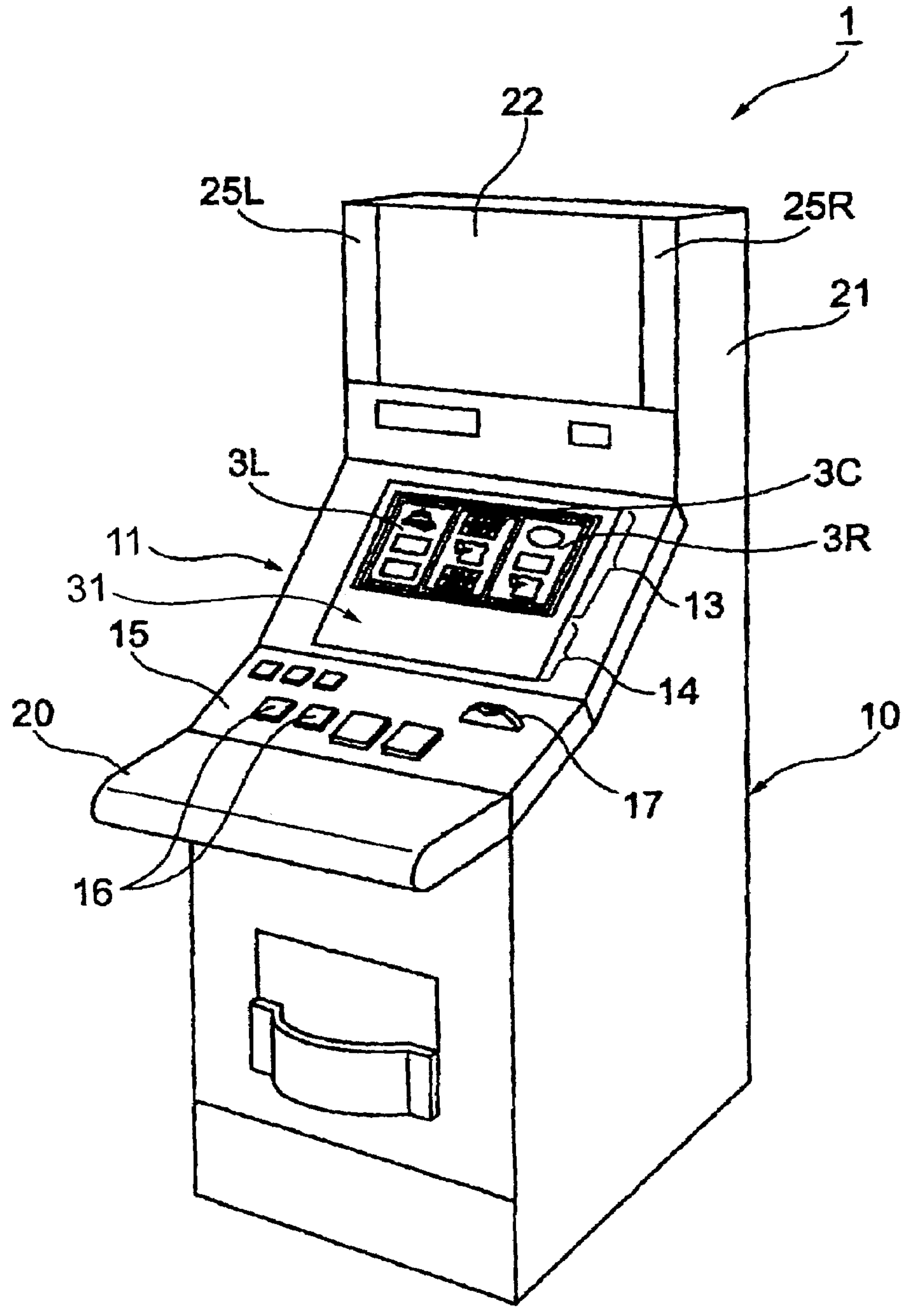
FIG. 1 is a perspective view of a slant-type slot machine as a gaming machine according to an embodiment of the present invention.

A slant-type slot machine is shown in FIG. 1 as a gaming machine. As shown in the drawing, a slot machine 1 according to the present embodiment comprises a gaming device including a reel unit composed of a plurality of rotation reels (discrimination display devices) 3L, 3C, and 3R arranged side by side in a line to be rotatable on each of which symbols (discrimination information) are drawn; and a cabinet 10 incorporating the gaming device therein.

The cabinet 10 comprises a door 11 openable from/closable to the cabinet 10. This door 11, in a closed position, slants such that it rises on a rear side with respect to the horizontal direction. In other words, in the slant-type slot machine 1, the door 11 in a closed state slants downward such that it falls from a back side to a front side of the slot machine 1.

Figure 7:
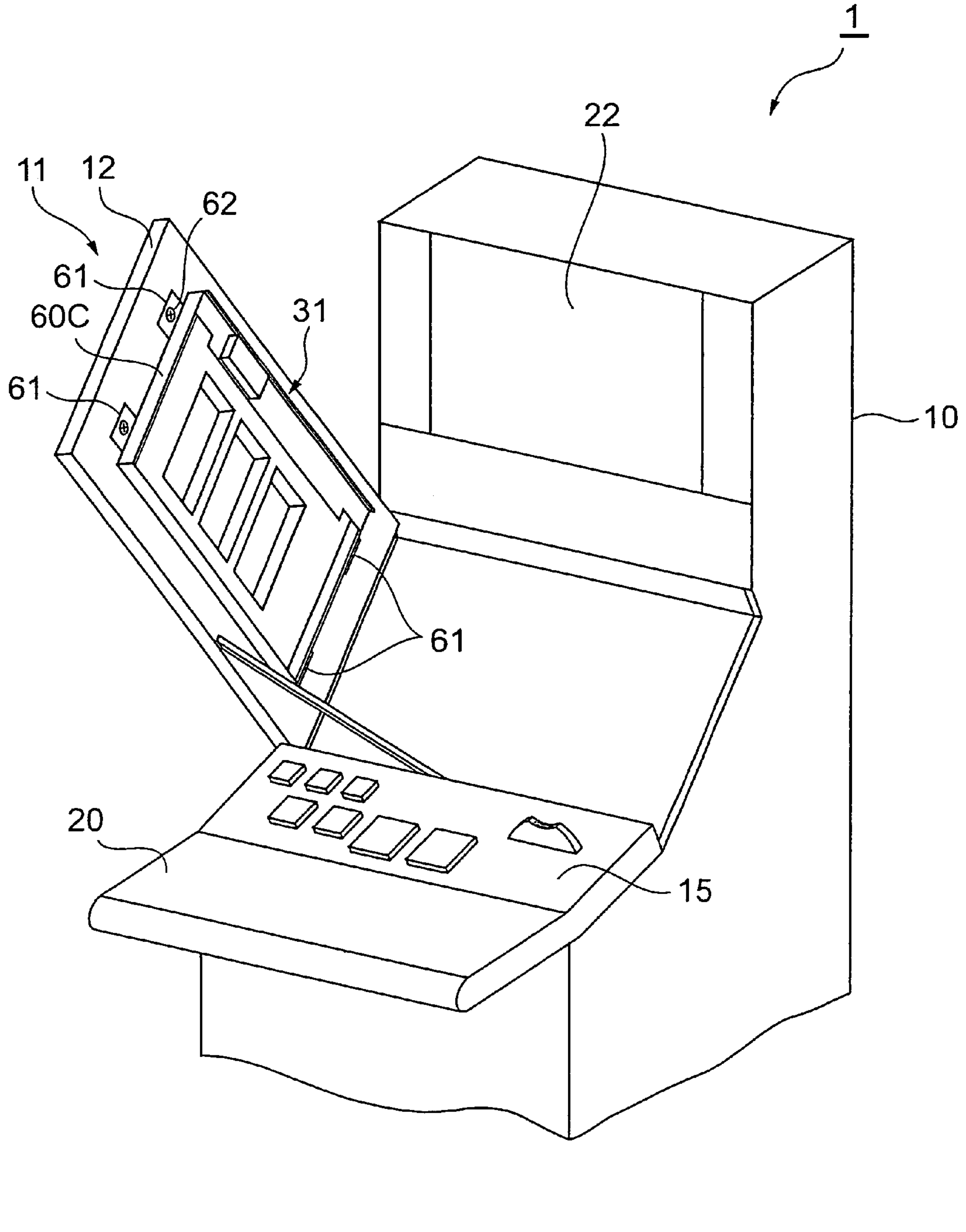
FIG. 7 is a perspective view of the slot machine shown in FIG. 1 with its door open.
Figure 8:
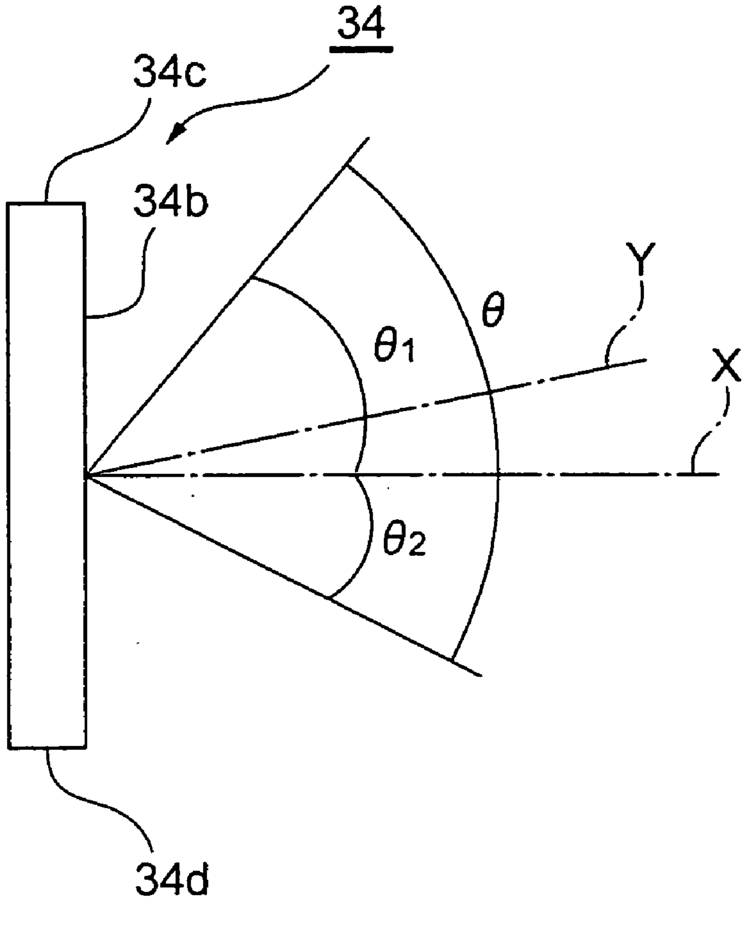
FIG. 8 is a side view schematically showing the liquid crystal panel.

This door 11 includes a frame 12 provided with an opening. The opening in the frame 12 is provided to allow a player to view a screen of a liquid crystal display device 31 and the symbols on the rotation reels 3L, 3C, and 3R with the door 11 closed. To the frame 12, the liquid crystal display device 31 is attached. More specifically, as shown in FIG. 7, a bracket 61 of the liquid crystal display device 31 is fixed to the frame 12 with screws 62.

As shown in FIG. 1, a symbol display region 13 where the symbols on the reels 3L, 3C, and 3R are transmission-displayed and a effect display region 14 where a effect image, information, and so on are displayed are provided on a display screen of the liquid crystal display device 31. In this case, even when the symbols on the reels 3L, 3C, and 3R are viewable (when the symbol display region 13 is separately provided as described above, though the whole display screen may be used as the performance display region 14), the symbol display region 13 is formed at a position deviated to the upper side of the liquid crystal screen to ensure efficiently as much as possible the size of the effect display region 14.

The cabinet 10 has a base portion (operation portion) 15 having a slant face gentler than the door 11 on the lower front side (player's side) of the door 11. On the base portion 15, game buttons 16 (a BET button, a reel rotation button, a reel stop button, and so on) as various kinds of operation means required for playing games, a slot 17 into which coins are thrown, and so on are formed.

On the front side of the base portion 15, an armrest 20 including a substantially flat surface is provided adjacent thereto. Provision of the armrest 20 allows the player to easily operate without fatigue the various kinds of game buttons 16 provided on the base portion 15 while sitting on a not-shown chair with his or her arms rested on the armrest 20.

Further, the cabinet 10 comprises a front-panel portion 21 vertically disposed on the rear side of the door 11. The front-panel portion 21 is provided with a payout table 22 displaying, for example, combinations of prize symbols, a payout table, and so on, and speakers 25L and 25R which generate effective sound for performance to increase amusement in game during play of a game, and so on.

Figure 2:
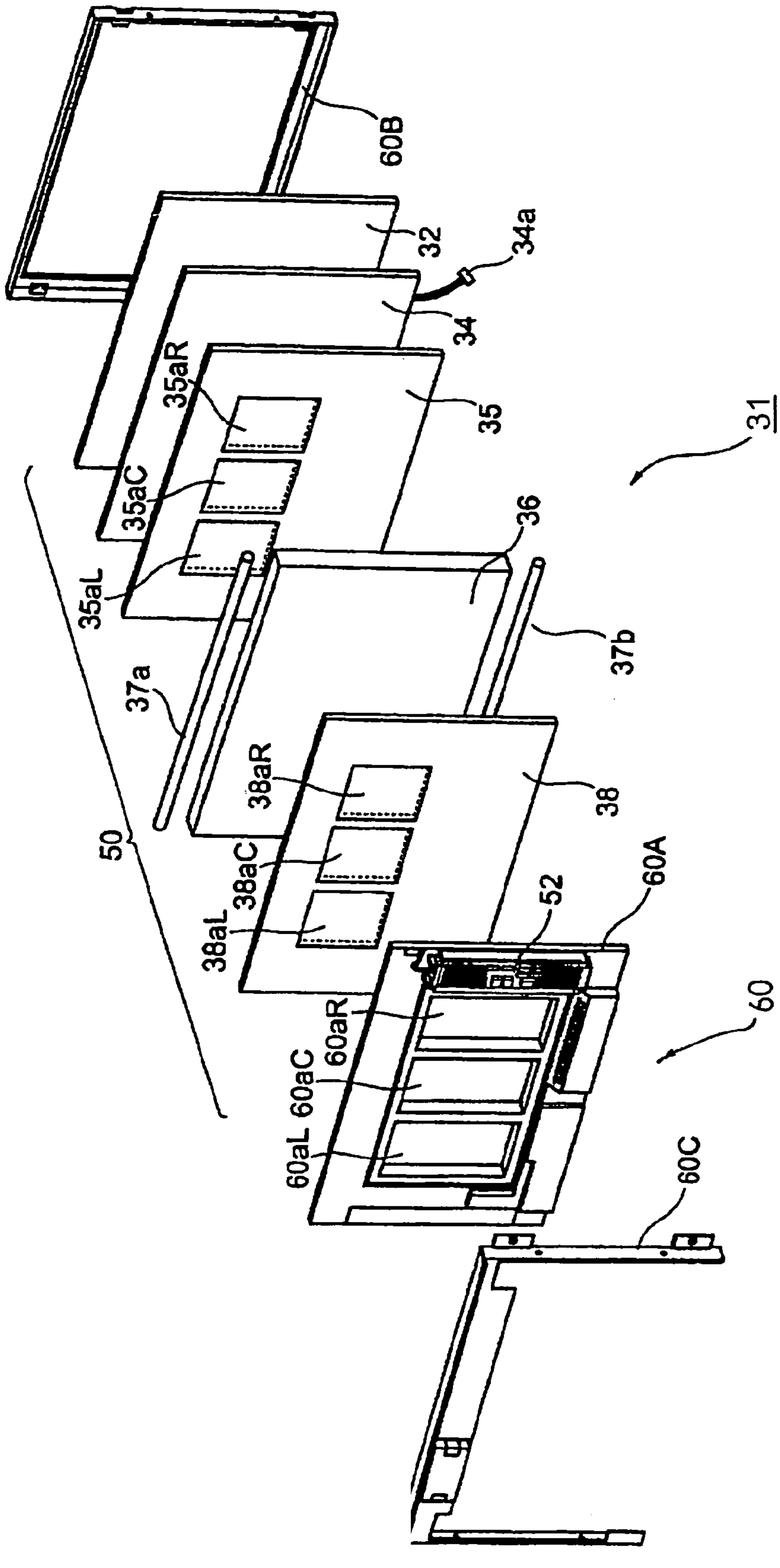
FIG. 2 is an exploded perspective view of a liquid crystal display device.

In FIG. 2, the structure of the transmissive liquid crystal display device 31 is shown in a disassembled state. As shown in the drawing, the transmissive liquid crystal display device 31 is constituted of a liquid crystal panel unit 50 composed of a protective glass 32, a liquid crystal panel 34 having a predetermined size (approximately 20 inches), a diffuser plate (diffuser sheet) 35, a light guide plate 36, and a reflector plate (reflector sheet) 38; and a liquid crystal panel holder 60 which holds the liquid crystal panel unit 50 and has an IC drive (drive portion) 52 for driving the liquid crystal panel 34.

The liquid crystal panel 34, which is constituted of a pair of transparent substrates (for example, glass substrates) and a liquid crystal material sandwiched therebetween, has a viewing region corresponding to the symbol display region 13 and has different viewing angles on one side and on the other side (on the upper side and on the lower side in this embodiment) of the panel region. More specifically, a center axis Y of a viewing angle in the liquid crystal panel unit 50 is not parallel to a normal line X of a surface (display surface) 34*b* of the liquid crystal panel 34. In this embodiment, the liquid crystal panel 34 has a viewing angle θ deviated to one side in a direction parallel to its surface (display surface) 34*b*. Therefore, where the viewing angle θ of the liquid crystal panel 34 is divided into a viewing angle $\theta_1$ and a viewing angle $\theta_2$ with reference to the normal line X, the viewing angle $\theta_1$ is greater than the viewing angle $\theta_2$. For example, the viewing angle θ is 150° in which the viewing angle $\theta_1$ is 80 degrees and the viewing angle $\theta_2$ is 70 degrees. It should be noted that the center axis Y of the viewing angle is generally on a center of the liquid crystal panel 34.

Figure 9:
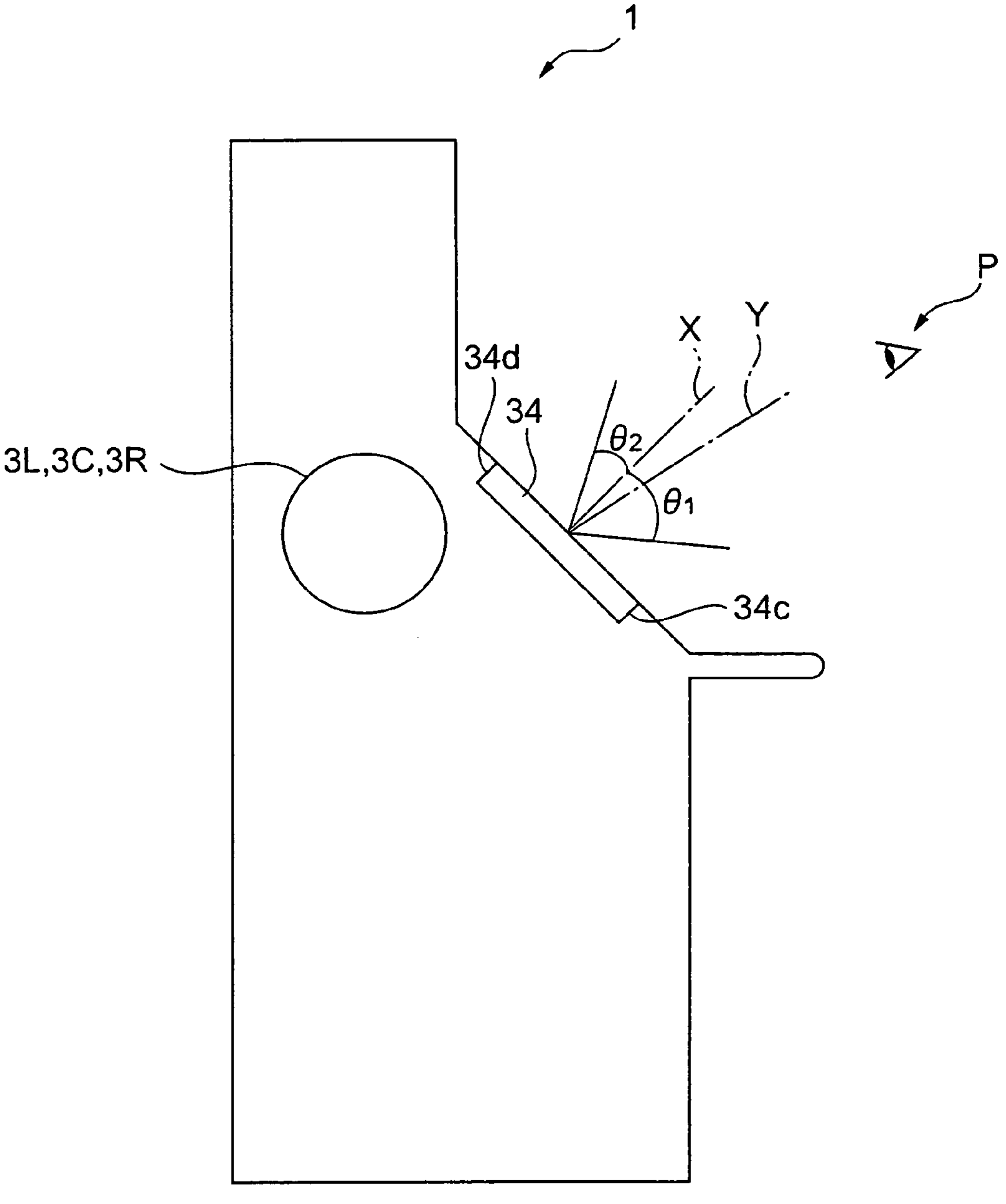
FIG. 9 is a side view schematically showing the slot machine shown in FIG. 1.

As shown in FIG. 9, in the slant-type slot machine 1, the viewpoint of the player is almost located at a lower side with respect to the normal line X. Therefore, the liquid crystal panel 34 is provided such that a wider viewing angle is necessarily provided to the lower side. Accordingly, this liquid crystal panel 34, in the slant-type slot machine 1, is provided such that an edge portion 34*c* on one side is positioned below an edge portion 34*d* on the other side as shown in FIG. 9. The center axis Y of the viewing angle is located below the normal line X of the liquid crystal panel 34. The liquid crystal panel 34 therefore provides a wider viewing angle in a direction in which a player's viewpoint is located.

Note that either a passive liquid crystal display device or an active matrix liquid crystal display device may be employed as the liquid crystal panel 34. Besides, the display mode of the liquid crystal panel 34 is preferably set to the normally white mode in which white display is performed with no voltage applied. This allows the player to view the symbols within the symbol display region 13 from the front side with no voltage applied to the liquid crystal panel 34 so that the player can continue playing the game. Further, a wiring cable 34*a* which is to be electrically connected to the IC drive 52 of the liquid crystal panel holder 60 extends from the liquid crystal panel 34.

On the back side (opposite side to the player) of the liquid crystal panel 34, the light guide plate 36 (for example, formed of a light transmissive material such as an acrylic resin) in a rectangular shape having the same size as that of the liquid crystal panel 34 is disposed across the diffuser plate 35. Further, the reflector plate 38 is disposed on the back side of the light guide plate 36, a main body 60A and an attachment member 60C of the liquid crystal panel holder 60 which will described later are disposed on the back side of the reflector plate 38, and the plurality of reels 3L, 3C, and 3R having the symbols drawn thereon respectively are disposed on the back side of the main body 60A and the attachment member 60C in correspondence with the symbol display region 13.

Light sources 37*a* and 37*b* are disposed along an upper and a lower end face of the light guide plate 36. These light sources 37*a* and 37*b* are for emitting light into the light guide plate 36 and thus constitute a backlight for the liquid crystal panel 34 (supply backlight to the liquid crystal panel 34) in cooperation with the light guide plate 36. Note that, as the light sources 37*a* and 37*b*, a cold-cathode tube or a fluorescent lamp may be used, or otherwise an LED may be used.

In the reflector plate 38 and the diffuser plate 35, three symbol viewing regions 38*a*L, 38*a*C, and 38*a*R; and 35*a*L, 35*a*C, and 35*a*R, respectively, which transmit the symbols formed on the respective reels 3L, 3C, and 3R to the symbol display region 13 (the liquid crystal panel 34) so as to allow the player to view the symbols are provided deviated to the upper side in a manner to correspond to the symbol display region 13. In this case, the symbol viewing regions 38*a*L, 38*a*C, and 38*a*R; and 35*a*L, 35*a*C, and 35*a*R may be open windows created by cutting them out from the reflector plate 38 and the diffuser plate 35, or may be regions formed of a light transmissive material having such a transparency as to allow the symbols to be clearly viewed rather than cut-out openings.

A deflection pattern which deflects the light entering the inside of the light guide plate 36 from the light sources 37*a* and 37*b* is formed on an opposed face of the light guide plate 36 opposed to the reflector plate 38. The light entering the upper and lower end faces of the light guide plate 36 from the light sources 37*a* and 37*b* is deflected by the deflection pattern while changing in traveling direction and exits from both surfaces of the light guide plate 36. Besides, the diffuser plate 35, normally appearing opaque white, is for diffusing light to prevent the above-described deflection pattern on the light guide plate 36 from being viewed (to make it blurry). That is the reason why the symbol viewing regions 35*a*L, 35*a*C, and 35*a*R are provided.

Figure 4:
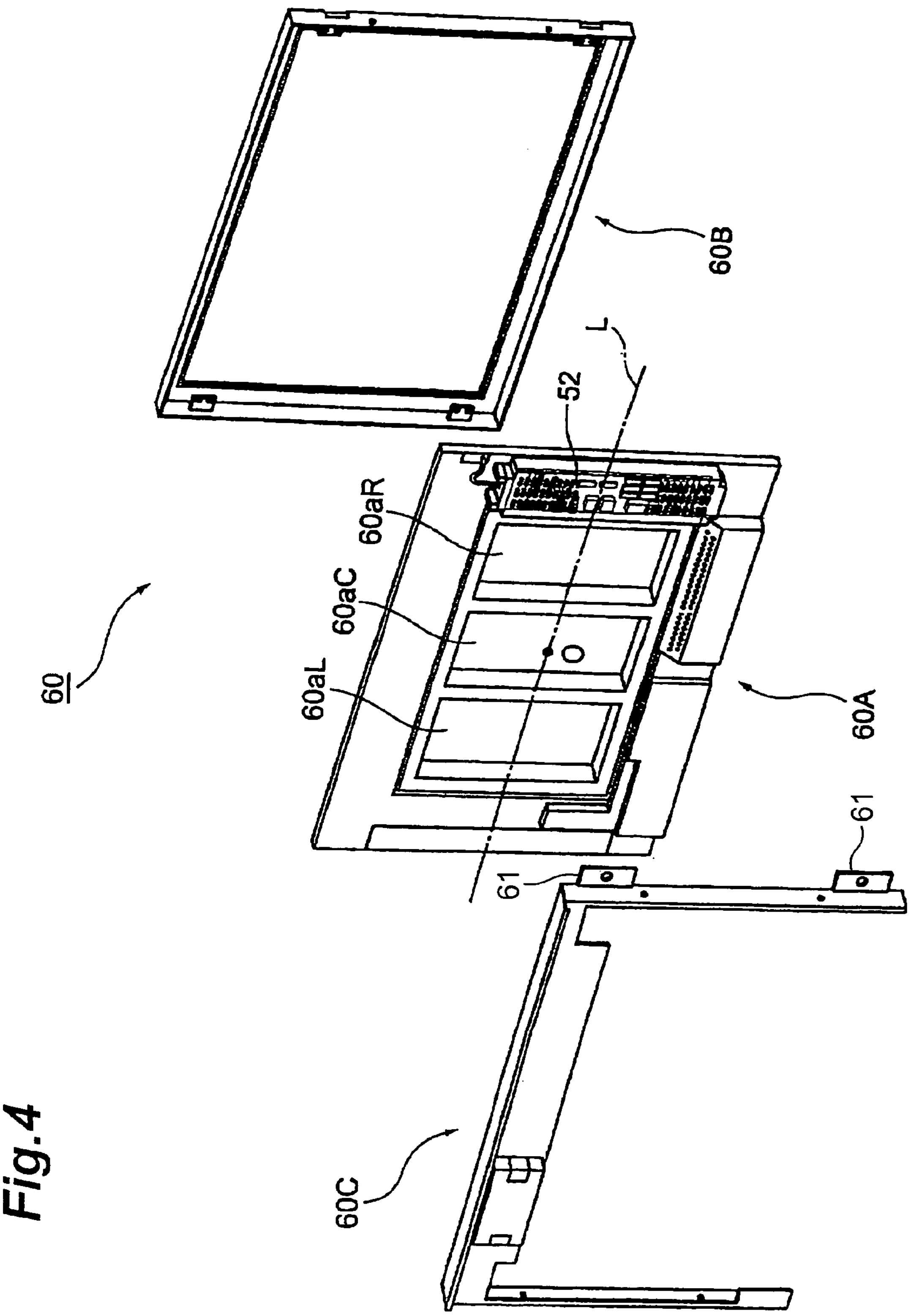
FIG. 4 is an exploded perspective view of the liquid crystal panel holder.

As shown in FIG. 2 and FIG. 4, the liquid crystal panel holder 60 is composed of the main body 60A serving as a retainer, disposed on the back side of the reflector plate 38 (the opposite side to the player), which retains the liquid crystal panel unit 50 on the back side and has the IC drive 52 for driving the liquid crystal panel 34 mounted on its back side; a holding frame 60B in a rectangular frame shape which is disposed on the front side of the liquid crystal panel unit 50 (the front side of the protective glass 32), and surrounds a front peripheral portion and peripheral side portion of the liquid crystal panel unit 50 to hold it and is assembled to the main body 60A; and the attachment member 60C fixed to the holding frame 60B and for attaching to the machine body of the slot machine 1 the liquid crystal panel holder 60 which holds the liquid crystal panel unit 50. That is, the liquid crystal panel holder 60 has the main body 60A being a support member for supporting the liquid crystal panel unit 50 from the back side, the holding frame 60B, and the attachment member 60C having the above-described bracket 61.

Figure 5:
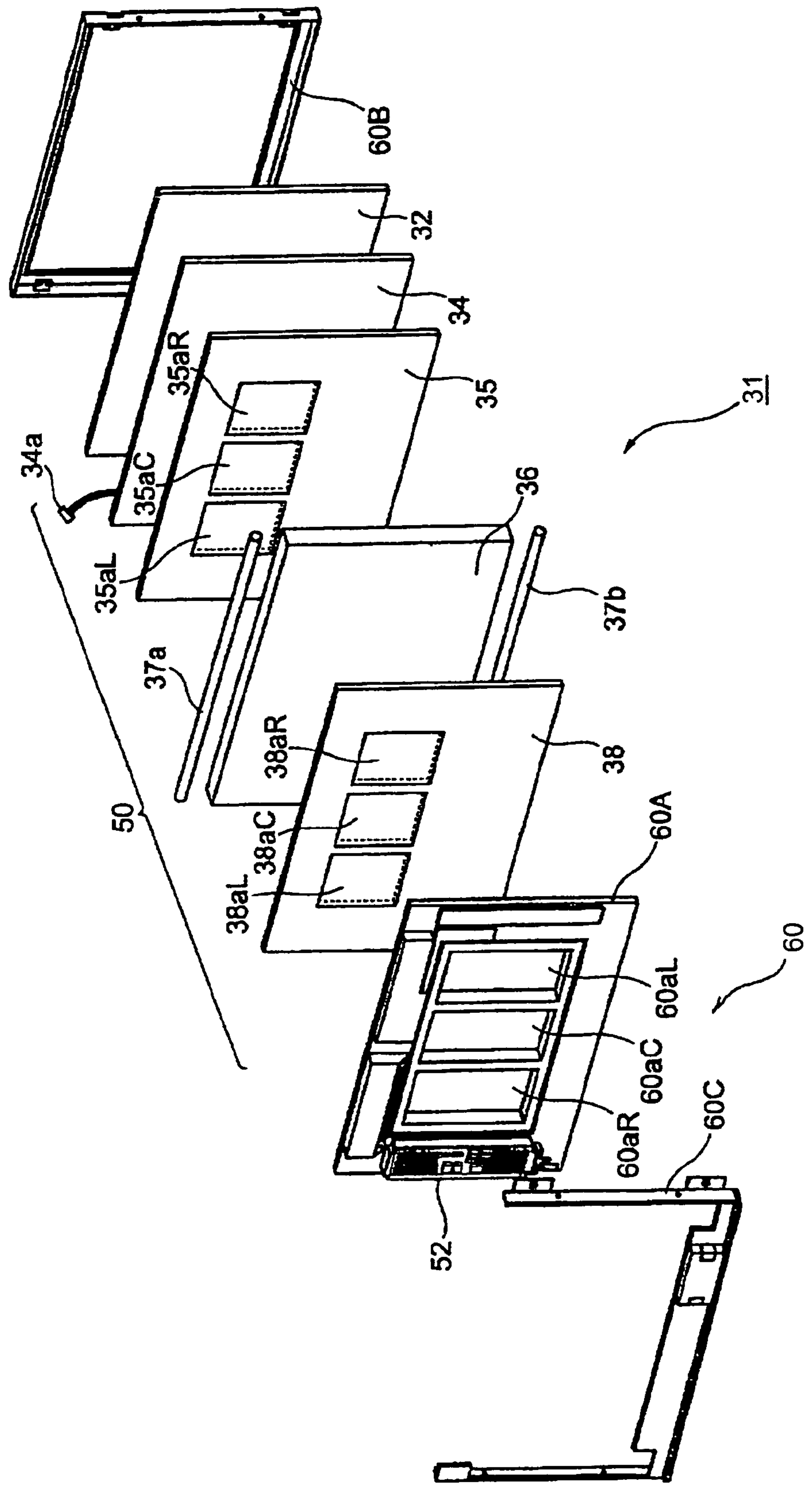
FIG. 5 is an exploded perspective view showing the liquid crystal panel and the liquid crystal panel holder in a state created by rotating them 180° from the state in FIG. 2.
Figure 6:
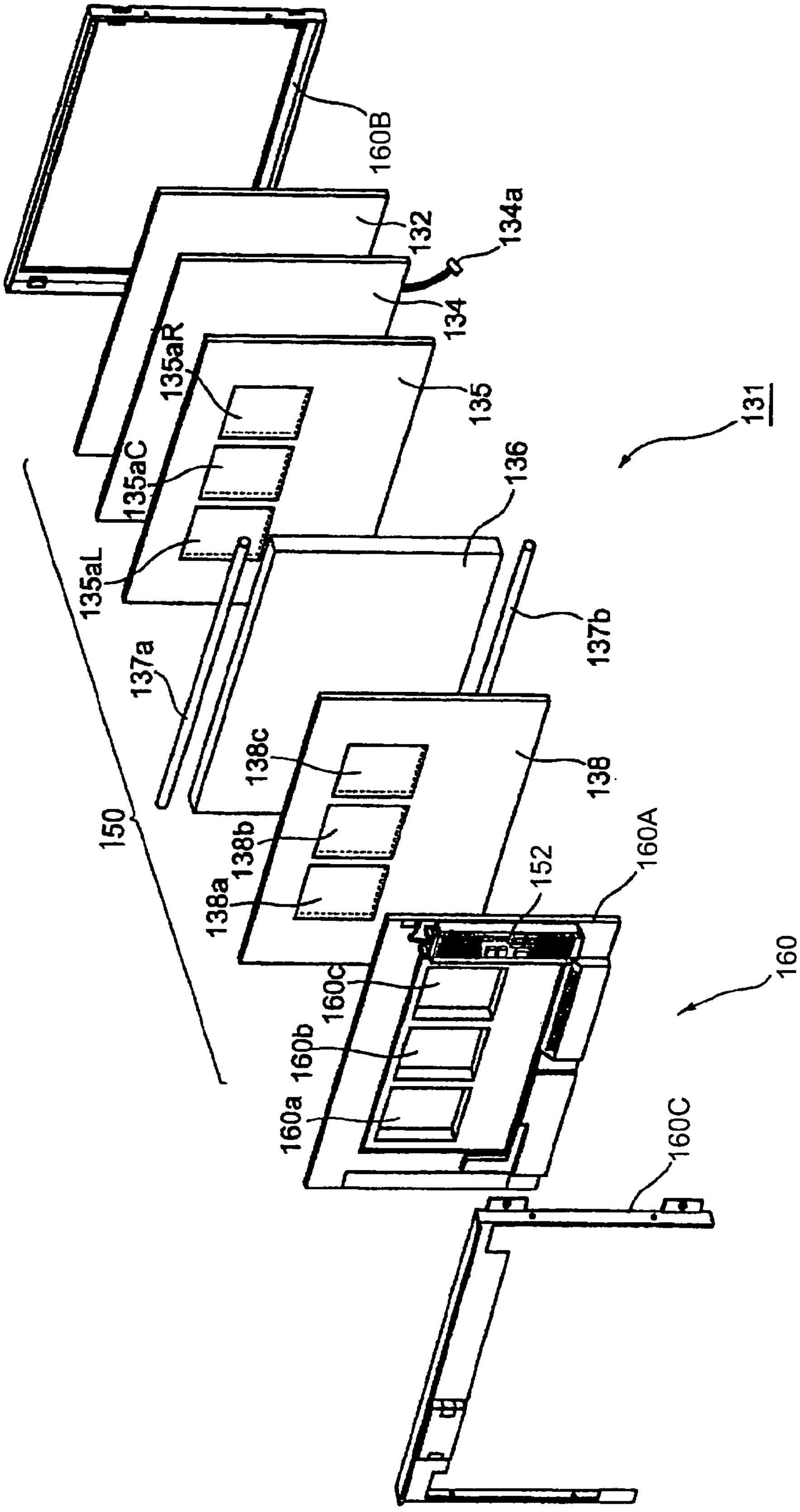
FIG. 6 is an exploded perspective view of a liquid crystal display device of a conventional slot machine.

The main body 60A of the liquid crystal panel holder 60 is formed with opening portions 60*a*L, 60*a*C, and 60*a*R for exposing the symbols on the reels 3L, 3C, and 3R toward the liquid crystal panel 34, in correspondence with the symbol viewing regions 38*a*L, 38*a*C, and 38*a*R; and 35*a*L, 35*a*C, and 35*a*R, respectively. Each of the opening portions 60*a*L, 60*a*C, and 60*a*R is arranged so as to have a region which is point symmetry with respect to a center of the main body 60A. It is preferable that the opening portions 60*a*L, 60*a*C, and 60*a*R are openings which are completely point symmetry. However, if each of the opening portions 60*a*L, 60*a*C, and 60*a*R has the region which is point symmetry, the opening portions 60*a*L, 60*a*C, and 60*a*R may not be point symmetry. In this case, the opening portions 60*a*L, 60*a*C, and 60*a*R are open in a size enough to expose the symbols on the reels 3L, 3C, and 3R toward the liquid crystal panel 34 even in the state in FIG. 5 which is created by rotating the main body 60A 180° around its center O from the state in FIG. 2 in which they expose the symbols on the reels 3L, 3C, and 3R toward the liquid crystal panel 34. In other words, the opening portions 60*a*L, 60*a*C, and 60*a*R are openings for transmitting light from the back side of the main body 60A toward the liquid crystal panel 34.

Figure 3:
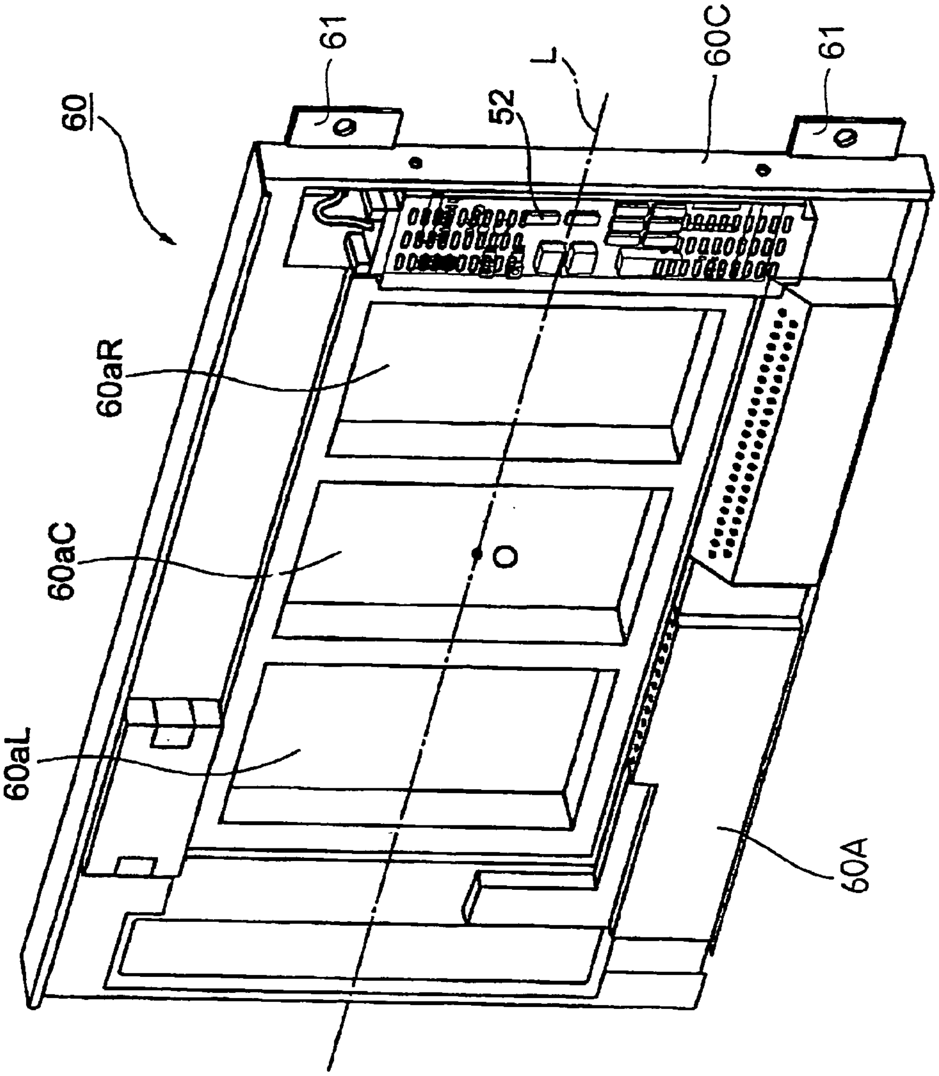
FIG. 3 is an enlarged perspective view of a liquid crystal panel holder constituting the liquid crystal display device in FIG. 2.

Specifically, the opening portions 60*a*L, 60*a*C, and 60*a*R extend downward to be about twice longer than the symbol viewing regions 38*a*L, 38*a*C, and 38*a*R, and are open, forming substantially symmetrical shapes with respect to the center line L in the top-to-bottom direction passing through the center O of the main body 60A of the liquid crystal panel holder 60 as clearly shown in FIG. 3 and FIG. 4.

In such a configuration, when the liquid crystal display device 31 in the state in FIG. 2 (the first state) mounted on the slant-type slot machine 1 shown in FIG. 1 is used in an upright-type slot machine 1*a* in which the player's viewpoint position is vertically inverted with respect to that in the slant-type slot machine 1, the liquid crystal panel 34 and the main body 60A of the liquid crystal panel holder 60 (also the holding frame 60B and the attachment member 60C in this embodiment; i.e. the whole liquid crystal panel holder 60) are rotated 180° about their centers with the protective glass 32, the diffuser plate (differ sheet) 35, the light guide plate 36, and the reflector plate (reflector sheet) 38 remained in the state in FIG. 2, into the second state (the state in FIG. 5), thereby inverting the upper and lower viewing angles of the liquid crystal panel 34 and ensuring consistency of electrical and mechanical connection between both 34 and 60A (enabling connection of the wiring cable 34*a* to the IC drive 52). Also in the second state, since the opening portions 60*a*L, 60*a*C, and 60*a*R are open, forming substantially symmetrical shapes with respect to the center line L in the top-to-bottom direction passing through the center O of the main body 60A of the liquid crystal panel holder 60 (they extend downward to be about twice longer than the symbol viewing regions 38*a*L, 38*a*C, and 38*a*R in this embodiment), they can expose the symbols on the reels 3L, 3C, and 3R toward the liquid crystal panel 34 (see FIG. 5).

Figure 10:
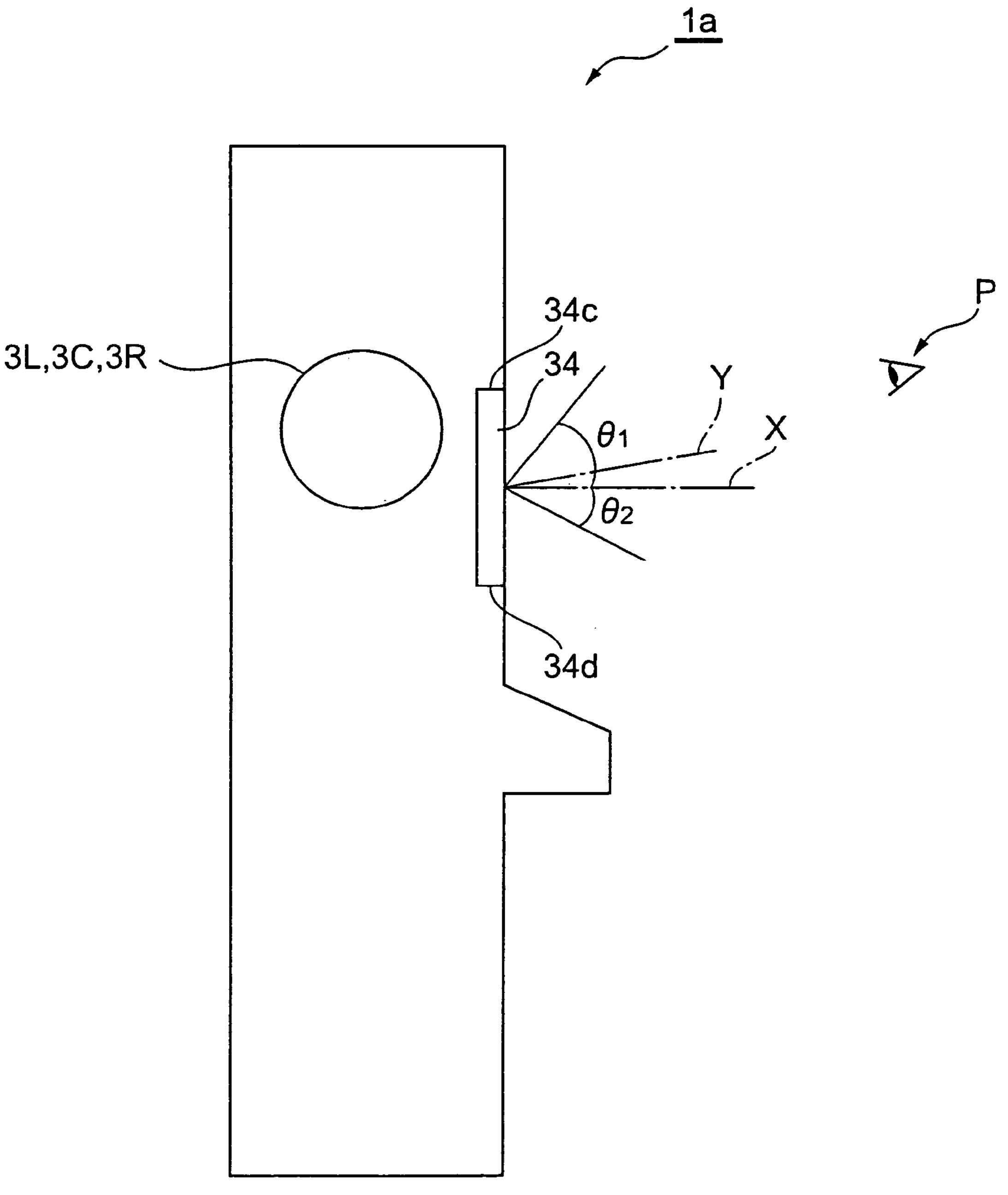
FIG. 10 is a side view schematically showing an upright-type slot machine as a gaming machine according to another embodiment of the present invention.

That is, the liquid crystal panel 34 is provided in a manner to be along the vertical surface in an upright-type slot machine 1*a* shown in FIG. 10. In the upright-type slot machine 1*a*, the viewpoint of the player is almost located at the upper side with respect to the normal line X. Therefore, the liquid crystal panel 34 is necessarily provided such that a wider viewing angle is provided to the upper side. Accordingly, in this slot machine 1*a*, the liquid crystal panel 34 is provided vertically inverted from the state shown in FIG. 9. More specifically, the liquid crystal panel 34 is provided such that the edge portion 34*c* on one side is positioned above the edge portion 34*d* on the other side. That is, the liquid crystal panel 34 is provided such that the center axis Y of the viewing angle is located above the normal line X of the liquid crystal panel 34. The liquid crystal panel 34 therefore provides a wider viewing angle in a direction in which the viewpoint of the player looking into the liquid crystal panel 34 from the front or the above is located.

Also in the slot machine 1*a*, the reels 3L, 3C, and 3R are provided at positions deviated to the upper side with respect to the liquid crystal display device 31, but the main body 60A thereof is vertically inverted with respect to the state in which it is mounted on the slot machine 1. Also in this case, since the opening portions 60*a*L, 60*a*C, and 60*a*R are provided so as to be point symmetry, the symbols on the reels 3L, 3C, and 3R are provided to the player through the opening portions.

As described above, in this embodiment, the main body (retainer) 60A of the liquid crystal panel holder 60 has the first state in which the symbols on the reels 3L, 3C, and 3R as the discrimination display devices are exposed toward the liquid crystal panel 34 through their opening portions 60*a*L, 60*a*C, and 60*a*R, and the second state created by rotating the main body 60A 180° around the center O of the liquid crystal panel holder 60 from the first state. Further, the opening portions 60*a*L, 60*a*C, and 60*a*R in the second state are also opened in a size capable of exposing the symbols on the reels 3L, 3C, and 3R toward the liquid crystal panel 34. Therefore, even when the liquid crystal panel 34 is rotated 180° to interchange its upper and lower positions and the main body 60A of the liquid crystal panel holder 60 is rotated 180° in accordance therewith to share the liquid crystal panel unit 50 between the slant-type slot machine and the upright-type slot machine having different player's viewpoint positions which are on the upper side or on the lower side, the symbols on the reels 3L, 3C, and 3R can be exposed toward the liquid crystal panel 34 through their opening portions 60*a*L, 60*a*C, and 60*a*R of the main body 60A. In other words, the whole liquid crystal panel holder 60 including the main body 60A can be shared between the slant-type slot machine and the upright-type slot machine, resulting in that the whole liquid crystal display device 31 composed of the liquid crystal panel holder 60 and the liquid crystal panel unit 50 can be shared between the slant-type slot machine and the upright-type slot machine.

The preferred embodiments of the present invention have been described, and the present invention is applicable to various gaming machines such as a pachinko (pinball) machine and so on as well as the slot machines described in the previously-described embodiments, and is effective in the case in which all the parts of the liquid crystal display device including the liquid crystal panel having different viewing angles on one side and on the other side are shared between different types of machines having different player's viewpoint positions on the liquid crystal screen which are on one side or on the other side.

As has been described, according to the gaming machine of the present invention, all the parts of the liquid crystal display device including the liquid crystal panel having different viewing angles on one side and on the other side (for example, on the upper side and on the lower side) can be shared between different types of machines having different player's viewpoint positions on the liquid crystal screen which are on one side or on the other side (for example, on the upper side or on the lower side). In other words, a liquid crystal display device which can be shared between gaming machines having different player's viewpoint positions and a gaming machine including the liquid crystal display device can be provided.

What is claimed is:

1. A liquid crystal display device, comprising:

a liquid crystal panel unit having a liquid crystal panel; and a support member supporting the liquid crystal panel unit from a back side of the liquid crystal panel unit, wherein a center axis of a viewing angle in of the liquid crystal panel unit is not parallel to a line normal to a surface of the liquid crystal panel, the support member is provided with an opening portion transmitting light from the back side of the support member toward the liquid crystal panel unit, and the opening portion has a region which has a 180° rotational symmetry with respect to a center point of the supporting member.

2. The liquid crystal display device according to claim 1, wherein the opening portion is substantially symmetrical with respect to the center of the supporting member.

3. A gaming machine, comprising:

a liquid crystal display device including:

a liquid crystal panel unit having a liquid crystal panel; and a support member supporting the liquid crystal panel unit from a back side of the liquid crystal panel unit, wherein a center axis of a viewing angle of the liquid crystal panel unit is not parallel to a line normal to a surface of the liquid crystal panel, the support member is provided with an opening portion transmitting light from the back side of the support member toward the liquid crystal panel unit, and the opening portion has a region which has a 180° rotational symmetry with respect to a center point of the supporting member; and a discrimination information display device for variably displaying discrimination information for a game at a position deviated to one side of the liquid crystal display device, the discrimination display device being provided on the back side of the liquid crystal panel unit.

4. The gaming machine according to claim 3, being a slant gaming machine in which the liquid crystal panel slants downward from a back side toward a front side of the gaming machine, wherein the liquid crystal display device is mounted so that the center axis of the viewing angle is located below the line normal to the surface of the liquid crystal panel.

5. The gaming machine according to claim 3, being an upright gaming machine in which the liquid crystal panel is vertical, wherein the liquid crystal display device is mounted so that the center axis of the viewing angle is located above the line normal to the surface of the liquid crystal panel.

6. A gaming machine, comprising:

a liquid crystal panel unit having a liquid crystal panel displaying an image associated with a game, the liquid crystal panel having different viewing angles on opposite sides of a line normal to a display screen of the liquid crystal panel a discrimination display device for variably displaying discrimination information required for the game at a position deviated to one of the sides of the line normal to the display screen of the liquid crystal panel; and a retainer retaining and located at a backside of the liquid crystal panel unit, the retainer being provided with a driver for driving the liquid crystal panel and an opening portion for exposing the discrimination information on the discrimination display device toward the liquid crystal panel, wherein the retainer has a first orientation in which the discrimination information on the discrimination display device is exposed toward the liquid crystal panel through the opening portion, and a second orientation created by rotating the retainer 180° around a center of the retainer from the first orientation, and the opening portion, also in the second state, has a size exposing the discrimination information on the discrimination display device toward the liquid crystal panel.

7. The gaming machine according to claim 6, wherein the opening portion is substantially symmetrical with respect to a center line normal to and passing through the center of the retainer.

8. A gaming machine, comprising:

a liquid crystal panel unit having a liquid crystal panel displaying an image associated with a game, the liquid crystal panel having different viewing angles on opposite sides of a predetermined direction on a display screen of the liquid crystal panel;

a discrimination display device for variably displaying discrimination information required for the game at a position deviated to one side of the predetermined direction on the display screen of the liquid crystal panel; and a retainer retaining and located at a back side of the liquid crystal panel unit, the retainer being provided with a driver for driving the liquid crystal panel and an opening portion for exposing the discrimination information on the discrimination display device toward the liquid crystal panel, wherein the opening portion has a substantially symmetrical shape with respect to a center line passing through a center of the retainer.

9. The gaming machine according to claim 8, where in the opening has a 180° rotational symmetry with respect to the center line passing through the center of and normal to the retailer.

* * * * *